(12) United States Patent
Klee et al.

(10) Patent No.: US 10,135,544 B1
(45) Date of Patent: Nov. 20, 2018

(54) METHODS AND APPARATUS FOR RADIO FREQUENCY (RF) PHOTONIC SPECTROMETER USING OPTICAL FREQUENCY COMBS

(71) Applicant: Eagle Technology, LLC, Melbourne, FL (US)

(72) Inventors: Anthony C. Klee, Orlando, FL (US); Charles F. Middleton, Rockledge, FL (US); John Richard DeSalvo, Satellite Beach, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 15/875,138

(22) Filed: Jan. 19, 2018

(51) Int. Cl.
*G01R 23/00* (2006.01)
*H04B 10/67* (2013.01)
*H04B 10/69* (2013.01)
*H04B 10/079* (2013.01)
*H04B 10/00* (2013.01)

(52) U.S. Cl.
CPC ....... *H04B 10/676* (2013.01); *H04B 10/0795* (2013.01); *H04B 10/69* (2013.01); *H04B 2210/006* (2013.01)

(58) Field of Classification Search
CPC .................................. G01R 23/16; G01R 23/17
See application file for complete search history.

(56) References Cited

U.S. PATENT DOCUMENTS

| | | |
|---|---|---|
| 6,853,456 B2 | 2/2005 | Mells |
| 7,324,208 B2 | 1/2008 | Niki |
| 7,564,561 B2 | 7/2009 | Peng |
| 7,830,526 B2 | 11/2010 | Peng et al. |
| 8,515,285 B2 | 8/2013 | DeSalvo et al. |
| 8,526,817 B2 | 9/2013 | Middleton et al. |
| 8,611,759 B1 * | 12/2013 | Kvavle .................. H04J 14/02 398/115 |
| 8,620,158 B2 | 12/2013 | Peach et al. |
| 8,842,992 B2 | 9/2014 | Middleton et al. |
| 8,879,919 B2 | 11/2014 | Peach et al. |

(Continued)

OTHER PUBLICATIONS

Burla et al. "Wideband dynamic microwave frequency identification system using a low-power ultracompact silicon photonic chip" Nature Communications; Sep. 30, 2016; http://www.nature.com/articles/ncomms13004: pp. 8.

(Continued)

*Primary Examiner* — Daniel Dobson
(74) *Attorney, Agent, or Firm* — Allen, Dyer, Doppelt + Gilchrist, P.A.

(57) ABSTRACT

A radio frequency (RF) photonic spectrometer may include a laser and a receiver branch including an optical modulator optically coupled to the laser and configured to modulate laser light based upon a radio frequency (RF) input signal, and an optical bandpass filter optically coupled to the optical modulator. The spectrometer may further include optical comb branches optically coupled to the laser and each including a frequency comb generator coupled to a respective RF reference signal, with the RF reference signals having different frequencies associated therewith. Furthermore, an output stage may be configured to determine a frequency of the RF input signal based upon outputs of the receiver branch and the optical comb branches.

20 Claims, 9 Drawing Sheets

(56) References Cited

U.S. PATENT DOCUMENTS

| | | | |
|---|---|---|---|
| 8,897,607 B2 | 11/2014 | DeSalvo et al. | |
| 8,971,671 B2 | 3/2015 | DeSalvo et al. | |
| 9,002,143 B2 | 4/2015 | DeSalvo et al. | |
| 9,680,576 B1 | 6/2017 | Middleton et al. | |
| 9,859,678 B2 | 1/2018 | Middleton et al. | |
| 2006/0202110 A1* | 9/2006 | Karlquist | G01R 23/17 250/227.12 |
| 2017/0363858 A1 | 12/2017 | Paolella et al. | |

OTHER PUBLICATIONS

Emami et al. "Photonic simultaneous frequency identification of radiofrequency signals with multiple tones" Appl Opt. Aug. 1, 2013;52(22):5508-15; Abstract Only.

Preetpaul Devgan "Advancements in RF photonics for signal processing applications on avionic platforms" Avionics, Fiber-Optics and Photonics Conference (AVFOP), 2013 IEEE: Abstract Only.

Giorgetta et al. "Fast high-resolution spectroscopy of dynamic continuous-wave laser sources" Nature Photonics 4, 853-857 (2010) http://www.nature.com/nphoton/journal/v4/n12/abs/nphoton.2010.228.html. Abstract Only.

David M. Benton "Photonic Processing for Wideband Cancellation and Spectral Discrimination of RF Signals" Advances in Optical Technologies vol. 2013. https://www.hindawi.com/journals/aot/2013/738427 pp. 8.

Kvavle et al. "Optical domain wideband RF spectrum analysis using parametric mixing" 2011 Conference on Lasers and Electro-Optics (CLEO): Date of Conference: May 1-6, 2011; Abstract Only.

Andrew M. Weiner Optical frequency comb technology for ultrabroadband radio-frequency photonics https://arxiv.org/ftp/arxiv/papers/1403/1403.2776.pdf; Retrieved from Internet Nov. 16, 2017; pp. 55.

Colice et al. "Broadband radio-frequency spectrum analysis in spectral-hole-burning media" Applied Optics vol. 45. No. 25; Sep. 1, 2006: https://static1.squarespace.com/static/55818d1fe4b03e6b0a2683ba/t/5592c5a5e4b0319eb74c198c/1435682213761/sa2.pdf pp. 16.

Lakshmi et al. "Detection and Extraction of Radio Frequency and Pulse Parameters in Radar Warning Receivers" ERCICA 2013, pp. 632-638, (2013).

Middleton et al. "An adaptive, agile, reconfigurable photonic system for managing analog signals" Harris Corporation White Paper: Harris.com; Sep. 10, 2014; pp. 10.

Raytheon AN/ALR-67(V)3 Radar Warning Receiver: https://www.raytheon.com/capabilities/products/alr67; Retrieved from internet Jan. 15, 2018; pp. 2.

Northrop Grumman AN/APR-39D(V)2 Radar Warning Receiver/Electronic Warfare Management System: ttp://www.northropgrumman.com/Capabilities/ANAPR39RWR/Pages/default.aspx; retrieved from Internet Jan. 15, 2018; pp. 1.

U.S. Appl. No. 15/454,067, filed Mar. 9, 2017.

U.S. Appl. No. 15/479,608, filed Apr. 5, 2017.

U.S. Appl. No. 15/447,388, filed Mar. 2, 2017.

David M. Benton, "Photonic Processing for Wideband Cancellation and Spectral Discrimination of RF Signals," 2013, Hindawi Publishing Corporation, Advances in Optical Technologies, vol. 2013, Article ID 738427, retrieved from the Internet Aug. 18, 2018 @ https://www.hindawi.com/journals/aot/2013/738427/, pp. 1-9.

Andrew M. Weiner and Victor Torres-Company, "Optical Frequency Comb Technology for Ultra-Broadband Radio-Frequency Photonics," Dec. 2013, retrieved from the internet Sep. 18, 2018 @ https://arxiv.org/ftp/arxiv/papers/1403/1403.2776.pdf, pp. 1-55.

Colice et al., "Broadband Radio-Frequency Spectrum Analysis in Spectral-Hole-Burning Media," Sep. 2006, Applied Optics, vol. 45, No. 25, retrieved from the internet Sep. 18, 2018 @ https://static1.squarespace.com/static/55818d1fe4b03e6b0a2683ba/t/5592c5a5e4b0319eb74c198c/1435682213761/sa2.pdf, pp. 6393-6408.

Burla et al., "Wideband Dynamic Microwave Frequency Identification System Using A Low-Power Ultracompact Silicon Photonic Chip," Sep. 2016, Nature Communications, 7:13004, retrieved from the internet Sep. 18, 2018 @ https://www.nature.com/articles/ncomms13004, pp. 1-8.

Kvavle et al., "Optical Domain Wideband RF Spectrum Analysis Using Parametric Mixing," May 2011, CLEO: 2011—Laser Science to Photonic Applications, retrieved from the internet Sep. 20, 2018 @ https://ieeexplore.ieee.org/document/5950515/?part=1, pp. 1-2.

\* cited by examiner

METHODS AND APPARATUS FOR RADIO FREQUENCY (RF) PHOTONIC SPECTROMETER USING OPTICAL FREQUENCY COMBS

TECHNICAL FIELD

The present invention relates to communications systems, and more particularly, to electro-optical communications devices and related methods.

BACKGROUND

Analog signal processing is an important part of many modern communications systems, such as satellite systems, for example. A received signal from an antenna may include digital or analog information, and it may ultimately be processed digitally, but unless the signal can be digitized directly (a challenging prospect as the frequency of the signal increases), there may be some amount of analog signal processing required. This may include amplification, filtering, transmission over some distance, distribution to multiple receivers/transmitters, and frequency conversion for up- or down-conversion. RF and microwave components are very mature, and a baseline level of performance has been demonstrated for these processing functions. Demand for capacity and the broader use and congestion of the electromagnetic spectrum are among the forces increasing the complexity, cost, and performance requirements of analog systems. As higher levels of performance and higher carrier frequencies become desired, especially in the millimeter wave portion of the spectrum, new approaches may be desirable to meet the challenges. Photonics offers certain advantages in this regard: bandwidth; size, weight and power (SWaP); linearity; frequency agility; and providing a reconfigurable infrastructure for analog signal processing.

Photonic systems may cover a wide frequency range and instantaneous bandwidth (IBW), with frequency ranges extending to millimeter waves and an IBW as large as 4 GHz or more. Optical fiber provides an exceptionally low loss transmission medium, with roughly 0.2 dB/km loss regardless of the analog frequency it is carrying. Wavelength division multiplexing may further extend bandwidth by allowing multiple signals to share the same path.

The ability to rapidly tune a system over wide frequency ranges opens up the useable spectrum, enabling a frequency agile system. A photonic system's frequency range is usually set by either the electro-optic modulator or the photodetector. For each of these components, commercial off-the shelf (COTS) devices exist extending well into the millimeter wave region of the spectrum. Tuning the wavelength of a laser or optical bandpass filter can provide quick access to any portion of the spectrum within the range of these components.

The wide bandwidth and large frequency range of a photonic system may provide a flexible, high frequency backbone that can adapt to changing missions. Such a reconfigurable system may enable flexible architectures, reduce the cost of ownership, and adjust to changing environments. Further background details on photonic frequency conversion systems may be found in Middleton et al., "An Adaptive, Agile, Reconfigurable Photonic System for Managing Analog Signals", Harris Corporation White Paper, Sep. 10, 2014, which is hereby incorporated herein in its entirety by reference.

Despite the advantages of such photonic systems, next generation digital receivers will likely operate over increasingly wider frequency ranges, and need a relatively high intercept probability. As a result, further improvement in signal identification systems for use with digital receivers may be desirable which can accommodate such broadband operation, yet with desired speed, accuracy, cost, and SWaP.

SUMMARY

A radio frequency (RF) photonic spectrometer may include a laser and a receiver branch including an optical modulator optically coupled to the laser and configured to modulate laser light based upon a radio frequency (RF) input signal, and an optical bandpass filter optically coupled to the optical modulator. The spectrometer may further include a plurality of optical comb branches optically coupled to the laser and each including a frequency comb generator coupled to a respective RF reference signal, with the RF reference signals having different frequencies associated therewith. Furthermore, an output stage may be configured to determine a frequency of the RF input signal based upon outputs of the receiver branch and the plurality of optical comb branches.

More particularly, the plurality of optical comb branches may include three optical comb branches. The receiver branch may further include an acousto-optic modulator coupled to the optical bandpass filter and a respective RF reference signal having a different frequency than the other RF reference signal frequencies. Additionally, the RF photonic spectrometer may also include a respective photodetector coupled between the output stage and the outputs of the receiver branch and the plurality of optical comb branches. In accordance with one example implementation, the output stage may include an analog-to-digital converter (ADC) coupled to the outputs of the receiver branch and the plurality of optical comb branches, and a digital signal processor (DSP) coupled to the ADC.

By way of example, the optical modulator may be a Mach-Zehnder modulator. Also by way of example, the optical bandpass filter may include a fiber Bragg grating. Additionally, the laser may be a continuous wave laser in one example implementation. Also, the photonic spectrometer may further include a photonic chip substrate, and the receiver branch, the plurality of optical comb branches, and the output stage may be on the photonic chip substrate.

A related RF receiver may include an RF photonic spectrometer, such as the one described briefly above, coupled to the RF antenna, and an encoder coupled to the output stage to generate a pulse descriptor word (PDW) based upon the determined frequency and temporal characteristics of the RF input signal. A related method is for determining a frequency of an RF signal and may include modulating light from a laser using an optical modulator based upon a radio frequency (RF) input signal, and filtering the modulated light using an optical bandpass filter optically coupled to the optical modulator. The method may further include using a plurality of frequency comb generators to generate outputs based upon the laser and respective RF reference signals, with the RF reference signals having different frequencies associated therewith, and determining and outputting a frequency of the RF input signal based upon outputs of the optical bandpass filter and the frequency comb generators.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

By way of background, as noted above, digital receivers may be tasked to cover increasing wide bandwidth as technology advances. Yet, this may in many applications require rapid identification of the frequency of an incoming signal, which may be particularly challenging across such a wide spectrum. More particularly, typical analog-to-digital converters (ADCs) do not have an operating range that extends over several gigahertz without making significant sacrifices in terms of vertical resolution. Other approaches, such as channelizing the input, may be problematic due to increased SWaP and noise figure. The present disclosure generally relates to RF photonic spectrometer configurations which may advantageously be used to provide rapid RF signal recognition, yet with desired resolution and SWaP.

Figure 1:
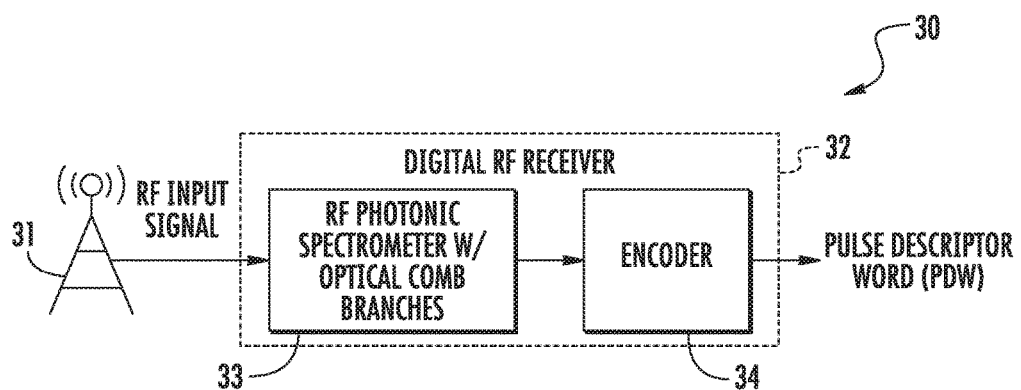
FIG. 1 is a schematic block diagram of a communications system in accordance with an example embodiment including a radio frequency (RF) receiver with an RF photonic spectrometer.

Turning now to FIG. 1, an example communications system 30 illustratively includes a wideband radio frequency (RF) antenna 31 configured to receive an RF input signal, and a digital RF receiver 32 coupled to the antenna. By way of example, the RF input signal may be a voice signal, radar signal, millimeter wave (mmW) signal, etc. The digital RF receiver 32 illustratively includes an RF photonic spectrometer 33 with optical comb branches which may advantageously determine a frequency of the RF input signal, and an encoder 34. The encoder 34 may output the determined frequency, along with other information about the RF input signal, in a pulse descriptor word (PDW) format, as will be discussed further below.

Figure 2:
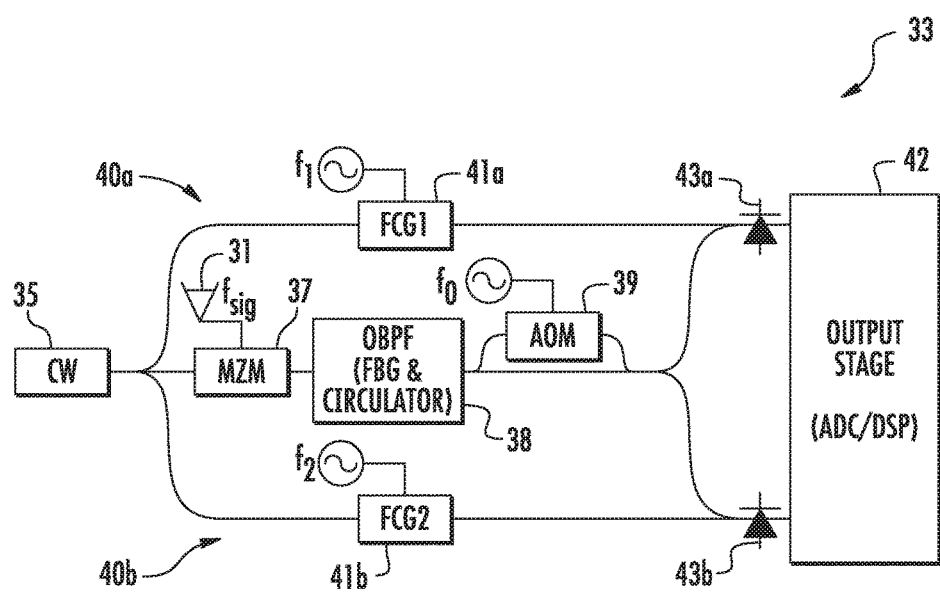
FIG. 2 is a schematic block diagram of an example RF photonic spectrometer which may be used in the receiver of FIG. 1.

Referring additionally to FIG. 2, a first example RF photonic spectrometer 33 embodiment is now described. In the illustrated example, the spectrometer 33 includes a laser 35, such as a continuous wave (CW) laser, for example. In accordance with one example implementation, the CW laser may have a 1550 nm wavelength, although other wavelengths may be used in different embodiments.

The spectrometer 33 further illustratively includes a receiver branch 36 including an optical modulator 37 optically coupled to the laser 35 and configured to modulate laser light based upon the RF input signal from the antenna 31, and an optical bandpass filter (OBPF) 38 optically coupled to the optical modulator. By way of example, the optical modulator 37 may be a Mach-Zehnder modulator (MZM), while the optical bandpass filter 38 may include a fiber Bragg grating (FBG) with a circulator associated therewith, although other suitable components may be used in different embodiments. The receiver branch 36 further illustratively includes an acousto-optic modulator (AOM) 39 coupled to the output of the optical bandpass filter 38 and a respective RF reference signal having a frequency $f_0$.

The spectrometer 33 further illustratively includes a plurality of optical comb branches 40a, 40b optically coupled to the laser 35. More particularly, each optical comb branch 40a, 40b illustratively includes a respective frequency comb generator 41a, 41b coupled to the output of the laser 35, and also to respective RF reference signals having frequencies $f_2$. The RF reference signal frequencies $f_0$, $f_1$, $f_2$ are different from one another. Furthermore, an output stage 42 is illustratively coupled to the receiver branch 36 and optical comb branches 40a, 40b by photodetectors 43a, 43b, respectively. Generally speaking, the output stage 42 may include an analog-to-digital converter (ADC) and digital signal processor (DSP), which is configured to determine a frequency of the RF input signal based upon outputs of the receiver branch 36 and the optical comb branches 40a, 40b, as well as perform other functions such as envelope detection, which will be discussed further below.

Figure 3:
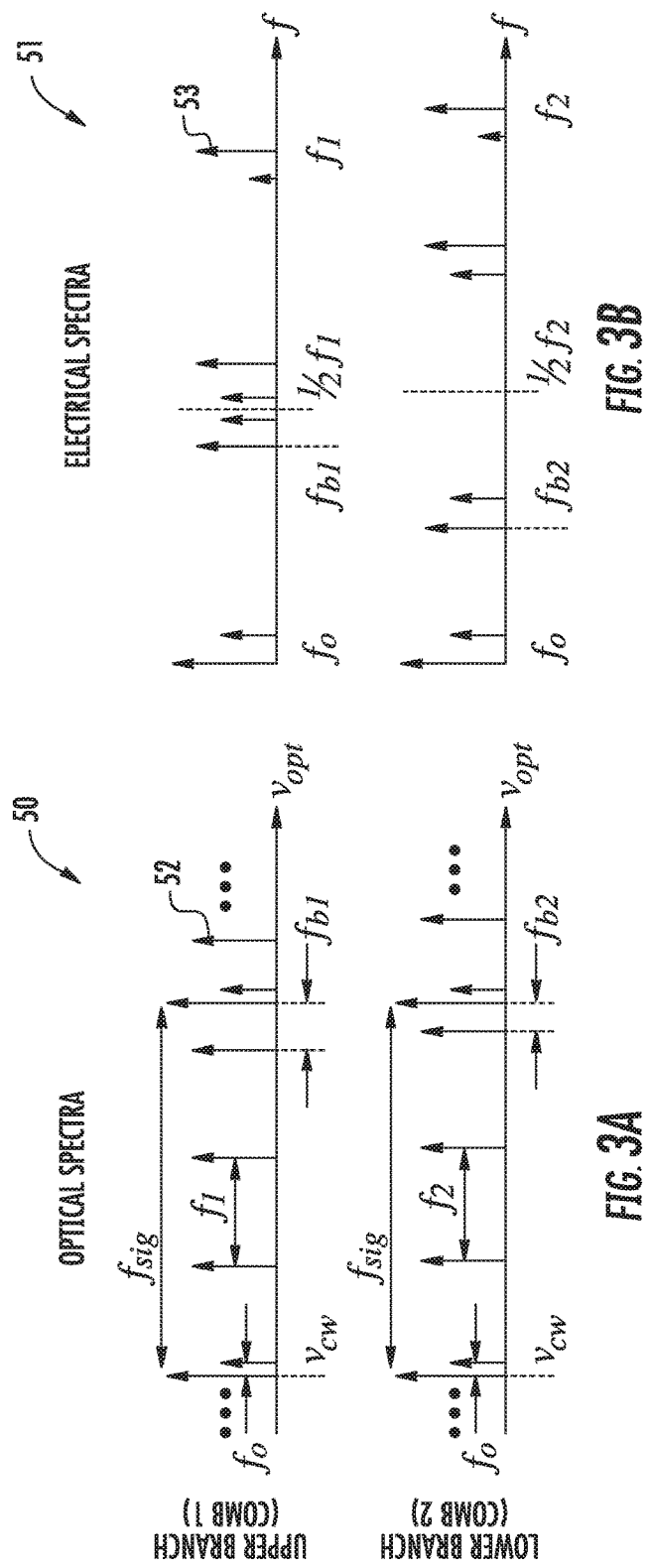
FIGS. 3A and 3B are optical and electrical spectrum diagrams associated with the RF photonic spectrometer system of FIG. 2.

Operation of the spectrometer 33 will be further understood with reference to the spectrum diagrams 50, 51 of FIGS. 3A, 3B. The wideband (e.g., 1-40 GHz) antenna 31 receives a signal of unknown frequency ($f_{sig}$). This signal is up-converted to optical frequencies via electro-optic modulation of the single frequency laser 35, creating optical sidebands offset from the laser carrier ($v_{cw}$) by the signal frequency $f_{sig}$. The OBPF 38 suppresses one of the modulation sidebands and the AOM 39 adds a frequency-shifted copy of the remaining sideband to aid in frequency disambiguation during back-end digital signal processing. The same light from the laser 35 is sent to the FCGs 41a, 41b, which each produce a grid of equally spaced optical or electrical modes 52, 53 centered around the laser carrier $v_{cw}$.

The mode spacings ($f_1$ and $f_2$) of the comb branches 40a, 40b are slightly detuned such that the modes "walk-off" from each other, effectively creating an optical Vernier scale. The mode spacings can be controlled via RF oscillators, for example. The up-converted signal is then combined with the output of each FOG 41a, 41b separately (as shown in the optical and electrical spectra graphs 50, 51) and photodetected. At the photodetectors 43a, 43b, the signal sideband mixes with the nearest comb line (and others, though ignored here for simplicity) to produce an electrical heterodyne beat at their difference frequency ($f_{b1}$ and $f_{b2}$) as seen in the graph 51. These low frequency beats can be digitized with readily available ADCs, measured, and compared to unambiguously identify the input signal frequency.

Figure 4:
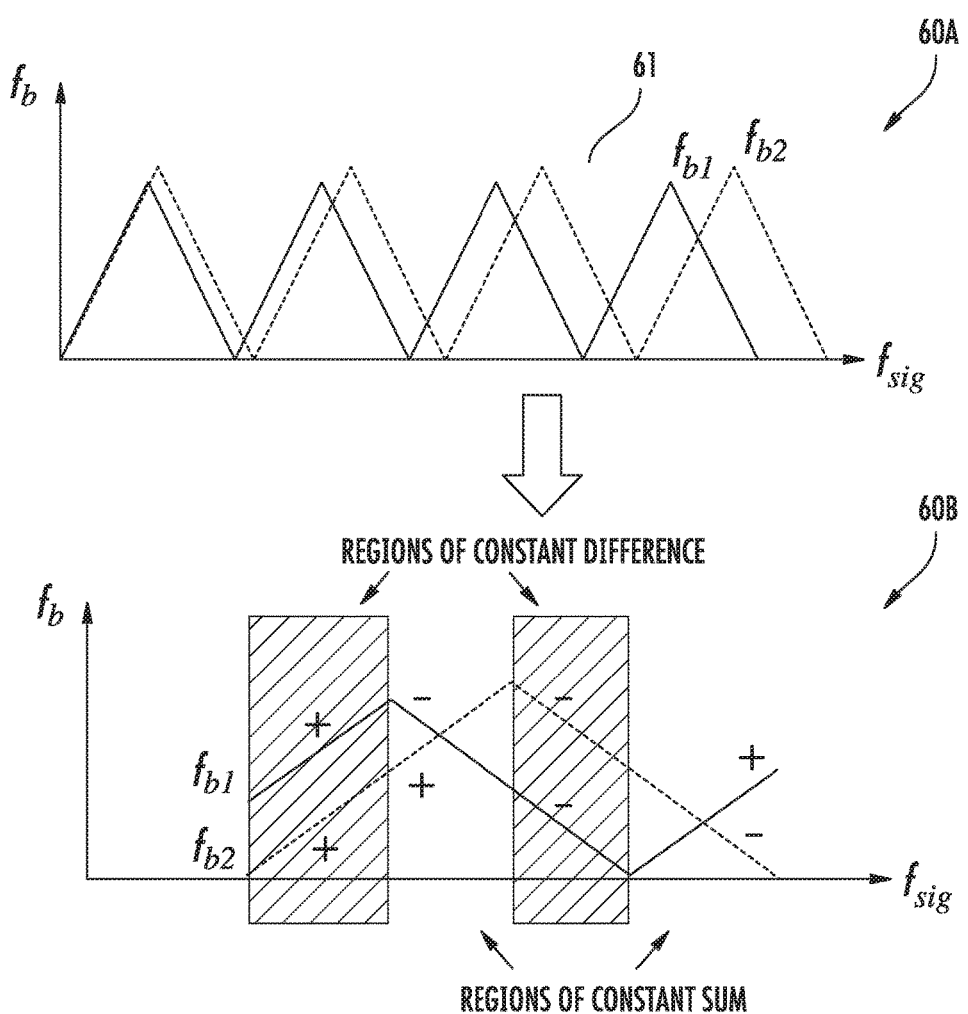
FIGS. 4-5 are graphs of heterodyne beat frequency vs. signal frequency illustrating an approach for determining input signal frequency with the RF photonic spectrometer of FIG. 2.
Figure 5:
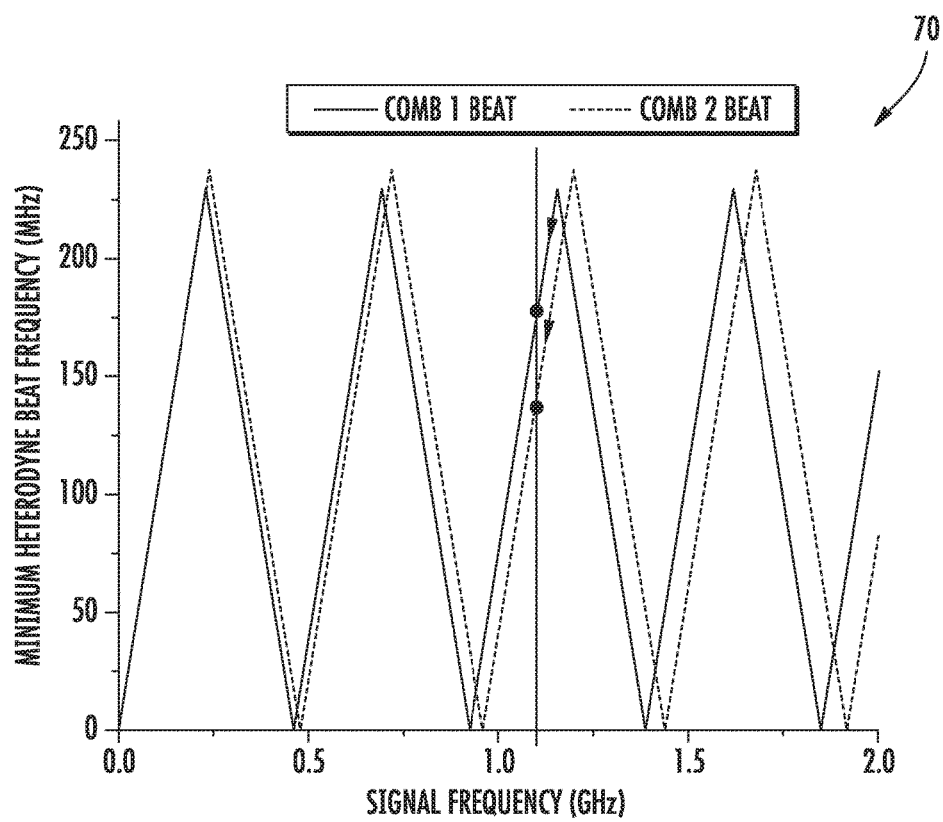

Frequency disambiguation based on the spectrometer 33 will be further understood with reference to the diagrams 60A, 60B of FIG. 4 and the diagram 70 of FIG. 5. In the diagram 60A, the heterodyne beat frequency produced by each comb ($f_{b1}$ and $f_{b2}$) is illustrated as a function of the signal frequency ($f_{sig}$). One period of this pattern (represented by box 61) is highlighted and expanded in the diagram 60B for clarity. Here it can be seen that there are two distinct regions to be considered where the plot lines possess either the same sign of slope (both positive or both negative) or differing slope sign (one positive and one negative). The heterodyne beat frequencies will have a constant difference within regions where the slope signs are the same, and they will have a constant sum within regions where the slope signs are different. In the optical spectra of FIG. 3A, the regions of constant difference correspond to when the signal sideband is on the same side of the nearest comb line for both combs. Regions of constant sum correspond to the signal sideband being above the nearest comb line of one comb and below the nearest comb line of the second comb.

Knowledge of which region the signal frequency is in can be exploited to determine the signal frequency. To identify whether an individual heterodyne beat is on a positive or negative slope, the comb parameters could be dithered while observing the corresponding sign of frequency change in the heterodyne frequency, though this approach may add latency to the spectrometer. Alternatively, a frequency-shifted copy of the signal, such as that generated by the AOM in FIG. 2, will produce a pilot tone in the heterodyne spectrum (sideband next to $f_{b1}$ and $f_{b2}$ in FIG. 3B) whose position relative to the primary heterodyne beats $f_{b1}$ and $f_{b2}$ will indicate the sign of slope. This can be clearly seen in the graph 70 of FIG. 5 where the primary heterodyne beat frequencies $f_{b1}$ and $f_{b2}$ are marked by circles and the pilot tones indicated by triangles occur at higher frequencies, signifying both $f_{b1}$ and $f_{b2}$ are on positive slopes and the signal is in a region of constant difference.

Once the signal has been determined to lie in a region of constant difference or constant sum, frequency retrieval is performed by calculating the index number N of the optical comb line producing the heterodyne beat. In regions of constant difference, this is defined by $$j_2 - j_1$$

$$f_{sig} = N \cdot f_2 \pm f_{b2}$$

The signal frequency is then calculated as follows $$N = \frac{|f_{b1} - f_{b2}|}{f - f}$$

where the addition or subtraction of $f_{b2}$ depends on the sign of slope as described above. In regions of constant sum, the signal frequency is calculated as $$N = \frac{f_2}{2(f_2 - f_1)} - \left| \frac{f_{b1} + f_{b2}}{f_2 - f_1} - \frac{f_2}{2(f_2 - f_1)} \right|$$

$$f_{sig} = N \cdot f_1 \pm f_{b1}$$

The maximum signal frequency that can be measured with this system is determined by the operating bandwidth of the up-converting MZM 37, which in the present example is 40 GHz, although other higher speed modulators may also be used. Measurement frequency resolution is set by the record length (measure a signal for a longer time for better resolution). Low latency digital signal processing enables real-time spectral monitoring over the entire 40 GHz (or other) measurement bandwidth. Furthermore, this approach is capable of measuring multiple input frequencies simultaneously.

Figure 6:
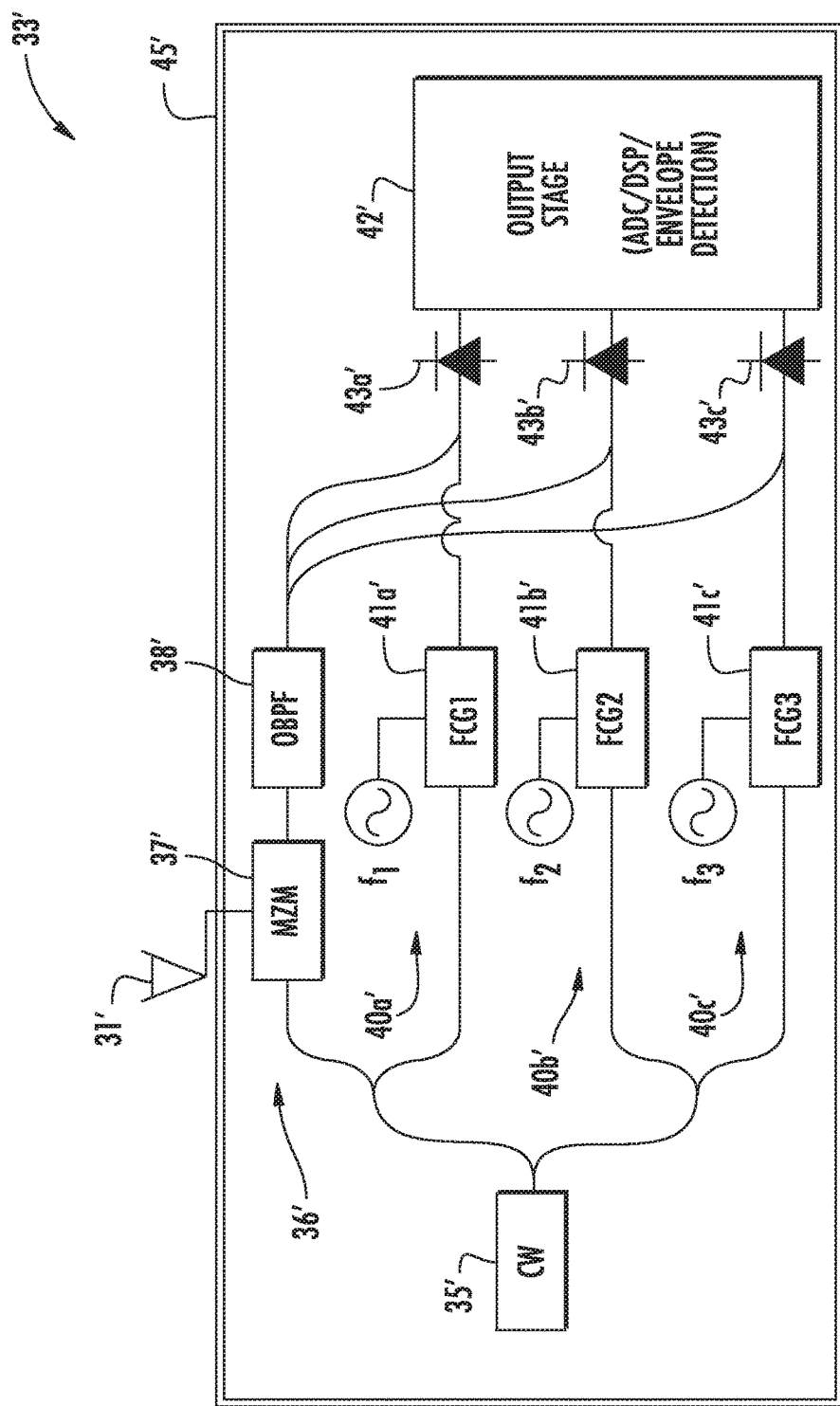
FIG. 6 is a schematic block diagram of an RF photonic spectrometer which may be used in the receiver of FIG. 1 in accordance with another example embodiment.

Turning to FIG. 6, another example embodiment of the RF photonic spectrometer 33' is now described. Similar to the spectrometer 33 described above, the spectrometer 33' illustratively includes a receiver branch 36' including an optical modulator 37' (e.g., MZM) optically coupled to the output of the laser 35 (e.g., CW laser), and an OBPF 38' optically coupled to the optical modulator. However, in this configuration, the receiver branch 36' does not include an AOM. Rather, in addition to optical comb branches 40a', 40b' which include the respective FCGs 41a', 41b', the spectrometer 33' also illustratively includes a third optical comb branch 40c' FCG 41c', with all of the FCGs being coupled to the output of the laser 35 and to a respective RF reference signals having different frequencies $f_1$, $f_2$, $f_3$. Furthermore, the output stage 42' is coupled to the receiver branch 36 and the optical comb branch 40a' via photodetector 43a', to the receiver branch and the optical comb branch 40b' via photodetector 43b', and to the receiver branch and the optical comb branch 40c' via photodetector 43c'.

This "triple-comb" spectrometer 33' characterizes RF signals of interest via heterodyne down-conversion, with detuned optical frequency comb branches 40a'-40c' and analysis of the digitized resulting baseband signals. More particularly, introduction of the third comb branch 40c' eliminates the need for the AOM 39 used in the embodiment described above with respect to FIG. 2, which makes the system more amenable to photonic integration on a chip. That is, the laser 35', receiver branch 36', the plurality of optical comb branches 40a'-40c', and the output stage 42' may all be integrated on a photonic chip substrate 45' as seen in the illustrated example as will be understood by those skilled in the art.

Furthermore, the receiver channel 36' effectively implements a pulse envelope detector so that the output stage 42' may identify temporal characteristics of the RF signal and enable simplified POW extraction for output by the encoder 34 (FIG. 1). By way of example, in addition to the determined frequency of the RF input signal, the PDW information output by the encoder 34 may further include: Time of Arrival (TOA); Time of Departure (TOD); Pulse Width (PW); Pulse Amplitude (PA); and Pulse Repetition Interval (PRI). Further information on POWs may be found in Lakshmi et al., "Detection and Extraction of Radio Frequency and Pulse Parameters in Radar Warning Receivers", Proceedings of International Conference on Emerging Research in Computing, Information, Communication and Applications, 2013, which is hereby incorporated herein in its entirety by reference.

Figures 7A, 7B:
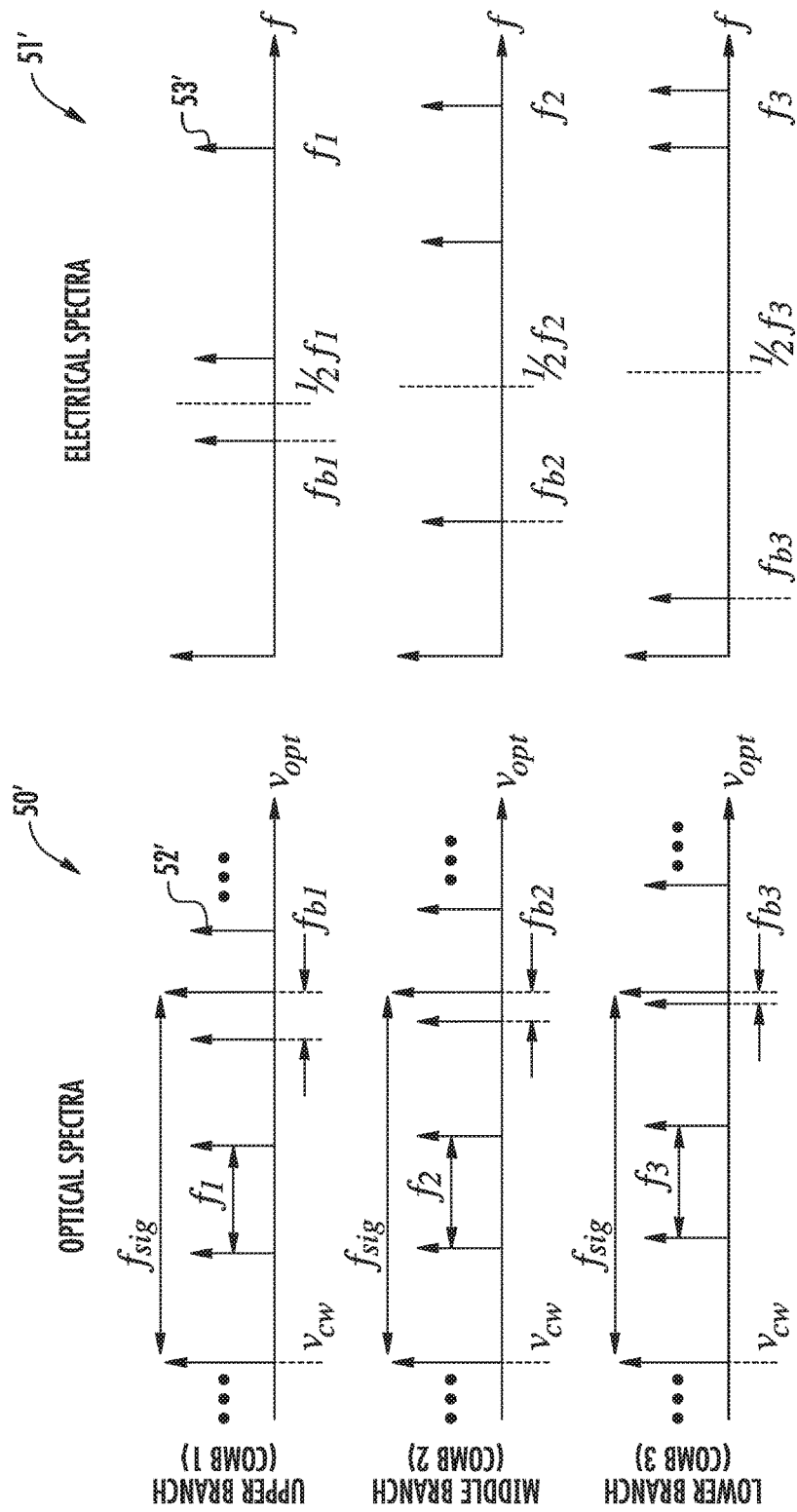
FIGS. 7A and 7B are optical and electrical spectrum diagrams associated with the RF photonic spectrometer system of FIG. 6.

Other advantages of the spectrometer 33' are that it may declutter the heterodyne spectrum as seen in the electrical spectra diagrams 51 in FIG. 7B relative to those in FIG. 3B, which significantly eases the back-end DSP to identify the primary heterodyne beat frequencies. Moreover, it may also extend the unambiguity range, and increase robustness to inconvenient signal frequencies (e.g., integer and half-integer harmonics of the combs' frequency spacing). Additionally, it provides the ability to time-synchronize Fourier analysis to specific pulses.

Figure 8:
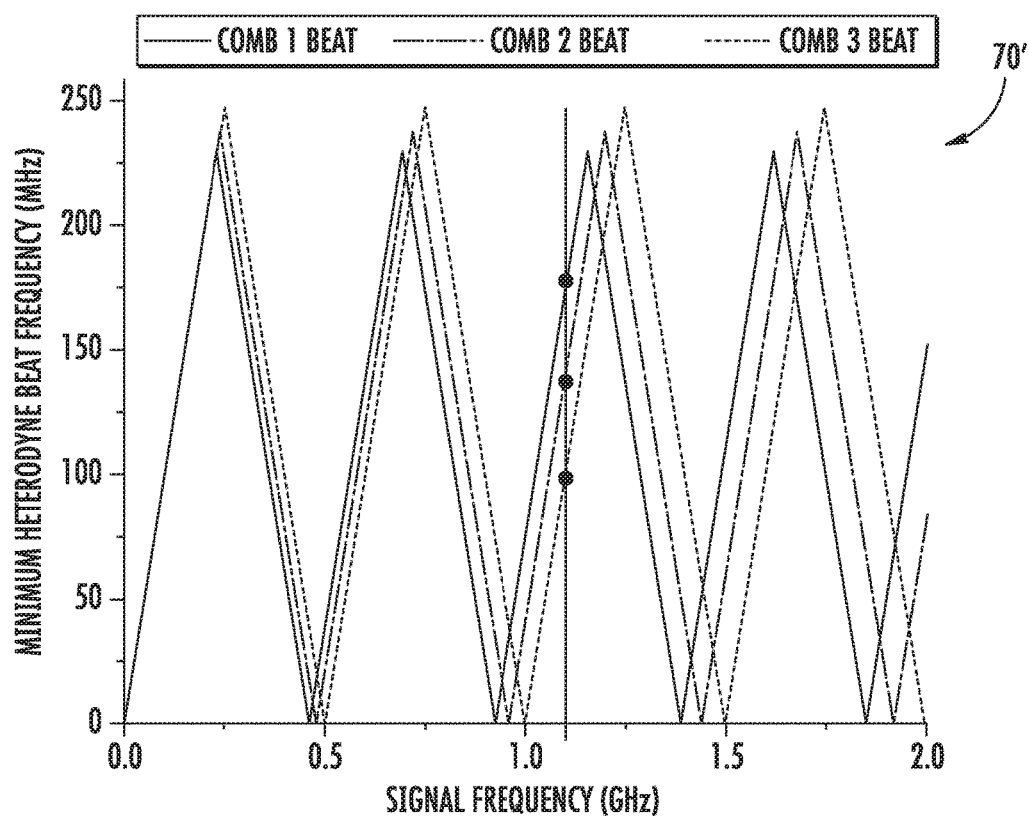
FIG. 8 is a graph of heterodyne beat frequency vs. signal frequency illustrating an approach for determining input signal frequency with the RF photonic spectrometer of FIG. 6.

The diagram 70' of FIG. 8 depicts the heterodyne beat frequencies of each comb as a function of the signal frequency. Unlike in FIG. 5, no pilot tone to determine slope sign is necessary. Instead, ambiguity is resolved by performing disambiguation with two pairs of combs and comparing the results to find the shared correct value. Specifically, the heterodyne frequencies from combs 1 and 2 are used to calculate the possible comb line index for both regions of constant difference and constant sum as follows:

$$N_{m,21} = \frac{|f_{b2} - f_{b1}|}{f_2 - f_1}$$

$$N_{p,21} = \frac{f_1}{2(f_2 - f_1)} - \left|\frac{f_{b2} + f_{b1}}{f_2 - f_1} - \frac{f_1}{2(f_2 - f_1)}\right|$$

Then the heterodyne frequencies from combs 2 and 3 are used to calculate the possible comb line index as:

$$N_{m,32} = \frac{|f_{b3} - f_{b2}|}{f_3 - f_2}$$

$$N_{p,32} = \frac{f_3}{2(f_3 - f_2)} - \left|\frac{f_{b3} + f_{b2}}{f_3 - f_2} - \frac{f_3}{2(f_3 - f_2)}\right|$$

Since both pairings of combs must yield the same retrieved signal frequency, the correct value of the comb line index N is then given by:

$$N = \text{mode}\{N_{p,21}, N_{m,21}, N_{p,32}, N_{m,32}\}$$

Finally, the signal frequency is calculated as:

$$f_{sig} = N \cdot f_2 + \text{signum}(f_{b1} - f_{b3}) \cdot f_{b2}$$

where the relative magnitude of $f_{b1}$ and $f_{b3}$ are compared to determine whether $f_{b2}$ is added or subtracted.

Figure 9:
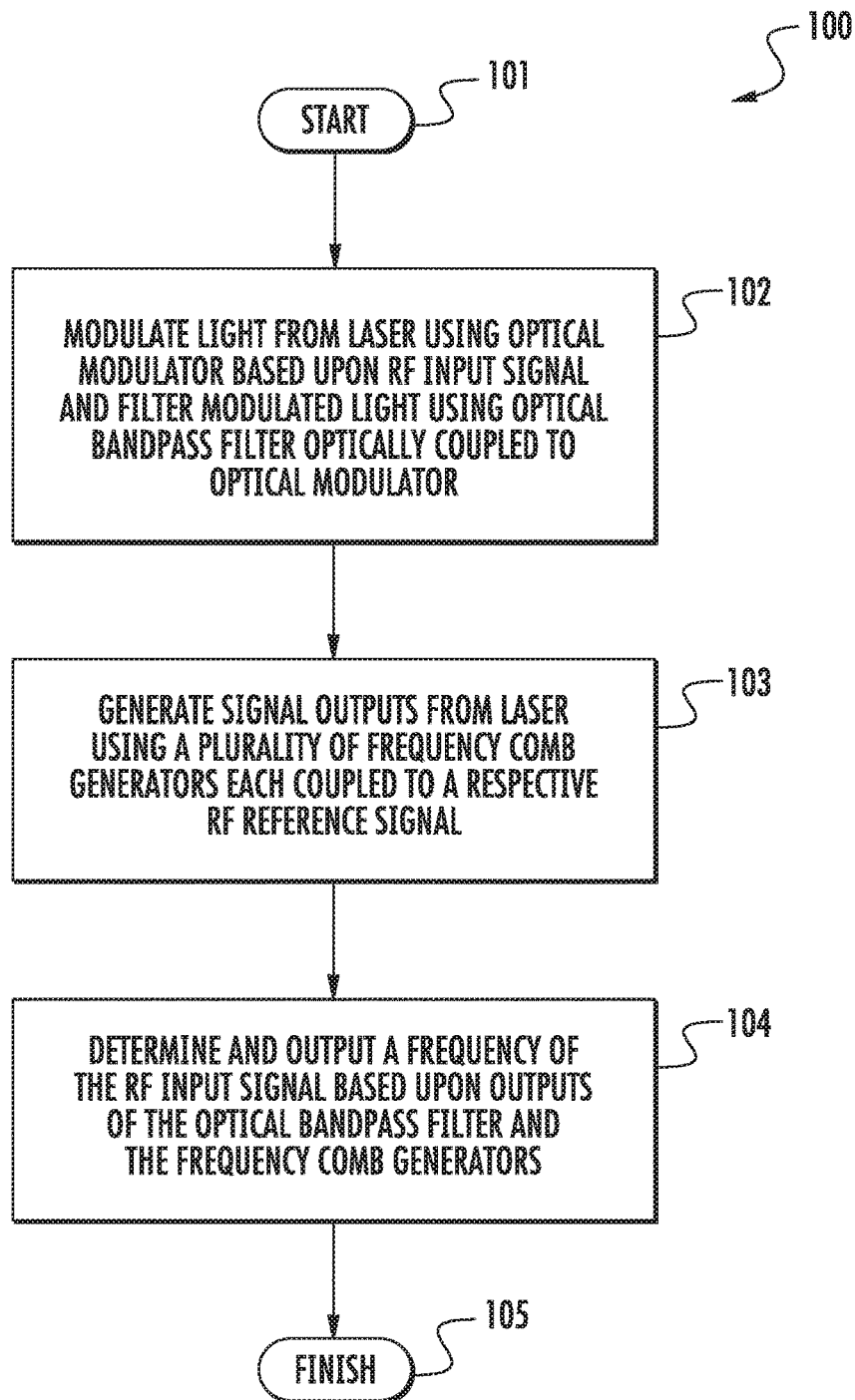
FIG. 9 is a flow diagram illustrating method aspects associated with the system of FIG. 1.

Related method aspects are now described with reference to the flow diagram 100 of FIG. 9. Beginning at Block 101, the method may include modulating light from a laser 35, 35' based upon an RF input signal (e.g., from an antenna 31, 31') using an optical modulator 37, 37', and filtering the modulated light using an optical bandpass filter 38, 38' optically coupled to the optical modulator, at Block 102. The method may further include generating signal outputs from the laser 35, 35' using a plurality of frequency comb generators 41a-41b, 41a'-41c' each coupled to a respective RF reference signal, with the RF reference signals having different frequencies $f_1$-$f_3$ associated therewith, at Block 103. The method may also include determining and outputting a frequency of the RF input signal at the output stage 42, 42' based upon outputs of the optical bandpass filter 38, 38' and the frequency comb generators 41a-41b, 41a'-41c', at Block 104, which illustratively concludes the method of FIG. 9 (Block 105). Further method aspects will be appreciated based upon the description above.

The above-described spectrometers 33, 33' may advantageously be used to provide an analog front-end for digital receivers that co-implement functionality for accurate, wideband, and high-speed down-conversion, frequency estimation, and PDW extraction. More particularly, this may provide for relatively wide measurement bandwidth (e.g., >40 GHz); ultra-low latency associated with analog front-end (e.g., <10 ns) and overall system latency limited by digital back-end acquisition time and simple DSP (~1 µs); time-bandwidth limited frequency resolution (e.g., 1 MHz resolution for 1 µs record); frequency sensitivity independent of signal frequency, unlike conventional instantaneous frequency measurement systems (IFMs); frequency sensitivity independent of signal power level, unlike conventional IFMs; capable of characterizing multiple simultaneous input signals; compatibility with chip-scale integration for low SWaP; simplified PDW extraction using optical Hilbert transform; and the ability to use low speed (~500 MHz) detection and digitization electronics.

The RF photonic spectrometers 33, 33' may also advantageously be used for spectrum monitoring as applied to 5G and Internet of Things (IoT) applications, for example. Generally speaking, future 5G Mobile and wireless communications may require the integration of new radio concepts such as massive MIMO, ultra-dense networks, moving networks, direct device-to-device communication, ultra-reliable communication, massive machine communication, etc. Exploitation of new spectrum bands will allow support of the expected dramatic increase in the mobile data volume, while broadening the range of application domains that mobile communications can support into the future.

Furthermore, long-range, large scale deployments of IoT networks may have the highest impact on the spectrum where 5G is the de-facto technology for future convergence of high data rate, high frequency optical fiber/wireless networks. At the wider scale, monitoring is an instrument that provides information on the overall health of the spectrum with respect to its intended usage. At the more local level, monitoring may be used as a tool to troubleshoot local problems, or (by sampling various locations) to obtain a more detailed view on the spectrum health. Furthermore, 5G requires moving to higher carrier frequencies for both bandwidth and lack of congestion.

Receivers implementing the RF photonic spectrometers set forth herein may advantageously provide the dynamic spectrum access required for ultra-dense network deployments operating at high frequencies. Moreover, they may also provide a spectrum management tool for autonomous and network-assisted device-to-device communication supporting such high mobility applications.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that other modifications and embodiments are intended to be included within the scope of the appended claims.

That which is claimed is:

1. A radio frequency (RF) photonic spectrometer comprising:
   a laser;
   a receiver branch comprising an optical modulator optically coupled to the laser and configured to modulate laser light based upon a radio frequency (RF) input signal, and an optical bandpass filter optically coupled to the optical modulator;
   a plurality of optical comb branches optically coupled to the laser and each comprising a frequency comb generator coupled to a respective RF reference signal, the RF reference signals having different frequencies associated therewith; and
   an output stage configured to determine a frequency of the RF input signal based upon outputs of the receiver branch and the plurality of optical comb branches.

2. The RF photonic spectrometer of claim 1 wherein the plurality of optical comb branches comprises three optical comb branches.

3. The RF photonic spectrometer of claim 1 wherein the receiver branch further comprises an acousto-optic modulator coupled to the optical bandpass filter and a respective RF reference signal having a different frequency than the other RF reference signal frequencies.

4. The RF photonic spectrometer of claim 1 further comprising a respective photodetector coupled between the output stage and the outputs of the receiver branch and the plurality of optical comb branches.

5. The RF photonic spectrometer of claim 1 wherein the output stage comprises an analog-to-digital converter (ADC) coupled to the outputs of the receiver branch and the plurality of optical comb branches, and a digital signal processor (DSP) coupled to the ADC.

6. The RF photonic spectrometer of claim 1 wherein the optical modulator comprises a Mach-Zehnder modulator.

7. The RF photonic spectrometer of claim 1 wherein the optical bandpass filter comprises a fiber Bragg grating.

8. The RF photonic spectrometer of claim 1 wherein the laser comprises a continuous wave laser.

9. The RF photonic spectrometer of claim 1 further comprising a photonic chip substrate; and wherein the receiver branch, the plurality of optical comb branches, and the output stage are on the photonic chip substrate.

10. A radio frequency (RF) receiver comprising:
    an RF photonic spectrometer comprising
        a laser,
        a receiver branch comprising an optical modulator optically coupled to the laser and configured to modulate laser light based upon a radio frequency (RF) input signal, and an optical bandpass filter optically coupled to the optical modulator,
        a plurality of optical comb branches optically coupled to the laser and each comprising a frequency comb generator coupled to a respective RE reference signal, the RF reference signals having different frequencies associated therewith, and
        an output stage configured to determine a frequency of the RF input signal based upon outputs of the receiver branch and the plurality of optical comb branches; and
    an encoder coupled to the output stage to generate a pulse descriptor word (PDW) based upon the determined frequency of the RF input signal.

11. The RF receiver of claim 10 wherein the plurality of optical comb branches comprises three optical comb branches.

12. The RF receiver of claim 10 wherein the receiver branch further comprises an acousto-optic modulator coupled to the optical bandpass filter and a respective RF reference signal having a different frequency than the other RF reference signal frequencies.

13. The RF receiver of claim 10 wherein the output stage comprises an analog-to-digital converter (ADC) coupled to the outputs of the receiver branch and the plurality of optical comb branches, and a digital signal processor (DSP) coupled to the ADC.

14. The RF receiver of claim 10 wherein the optical modulator comprises a Mach-Zehnder modulator.

15. The RF receiver of claim 10 wherein the RF photonic spectrometer further comprises a photonic chip substrate; and wherein the receiver branch, the plurality of optical comb branches, and the output stage are on the photonic chip substrate.

16. A method to determine a frequency of a radio frequency (RF) signal comprising:
    modulating light from a laser using an optical modulator based upon a radio frequency (RF) input signal, and filtering the modulated light using an optical bandpass filter optically coupled to the optical modulator;
    using a plurality of frequency comb generators to generate outputs based upon the laser and respective RF reference signals, the RF reference signals having different frequencies associated therewith; and
    determining and outputting a frequency of the RF input signal based upon outputs of the optical bandpass filter and the frequency comb generators.

17. The method of claim 16 wherein the plurality of optical comb branches comprises three optical comb branches.

18. The method of claim 16 further comprising modulating an output of the optical bandpass filter using an acousto-optic modulator based upon a respective RF reference signal having a different frequency than the other RF reference signal frequencies.

19. The method of claim 16 further comprising a respective photodetector coupled to the outputs of the optical bandpass filter and the plurality of optical comb branches.

20. The method of claim 16 further comprising using an encoder to generate a pulse descriptor word (PDW) based upon the determined frequency of the RF input signal.

\* \* \* \* \*